United States Patent
Chu

(10) Patent No.: US 10,312,746 B2
(45) Date of Patent: Jun. 4, 2019

(54) POWER PROVIDING EQUIPMENT, MOBILE DEVICE, OPERATING METHOD OF MOBILE DEVICE

(71) Applicant: HTC Corporation, Taoyuan (TW)

(72) Inventor: Feng-Seng Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 257 days.

(21) Appl. No.: 14/746,864

(22) Filed: Jun. 23, 2015

(65) Prior Publication Data

US 2015/0372530 A1    Dec. 24, 2015

Related U.S. Application Data

(60) Provisional application No. 62/015,534, filed on Jun. 23, 2014.

(51) Int. Cl.
*H02J 7/02* (2016.01)
*H02J 50/80* (2016.01)
*H02J 50/10* (2016.01)
*H02J 7/00* (2006.01)

(52) U.S. Cl.
CPC .............. *H02J 50/80* (2016.02); *H02J 7/025* (2013.01); *H02J 50/10* (2016.02); *H02J 2007/0096* (2013.01)

(58) Field of Classification Search
CPC .................... H04B 5/0037; H02J 7/025; H02J 2007/0096; H02J 50/80
USPC .......................................... 320/108; 307/104
See application file for complete search history.

(56) References Cited

U.S. PATENT DOCUMENTS

| | | | | |
|---|---|---|---|---|
| 5,805,998 A | * | 9/1998 | Kodama | H04M 1/72502 320/108 |
| 7,528,577 B2 | * | 5/2009 | Hara | G06F 1/3203 320/132 |
| 7,612,528 B2 | * | 11/2009 | Baarman | H01F 5/02 307/9.1 |
| 7,667,482 B2 | * | 2/2010 | Mort | G01R 15/14 324/764.01 |
| 7,933,633 B2 | * | 4/2011 | Lin | H04M 1/2535 455/561 |
| 8,116,681 B2 | * | 2/2012 | Baarman | A61L 2/10 235/492 |
| 8,212,520 B2 | * | 7/2012 | Takada | B60L 11/182 180/65.27 |
| 8,242,957 B2 | * | 8/2012 | Rofougaran | H01Q 1/2283 342/386 |

(Continued)

OTHER PUBLICATIONS

Wireless Power Consortium, "System Description, Wireless Power Transfer," vol. 2, part I, version 0.9, rev. 8, Jun. 2013.

(Continued)

*Primary Examiner* — Robert J Grant
*Assistant Examiner* — John T Trischler
(74) *Attorney, Agent, or Firm* — CKC & Partners Co., LLC

(57) ABSTRACT

An operating method includes receiving a wireless power signal from a power providing equipment; receiving a request from the power providing equipment; and under a condition that a battery level of a battery of the mobile device is less than a threshold value, transmitting an unavailable message to the power providing equipment, so that the power providing equipment charges the battery of the mobile device by utilizing the wireless power signal according to the unavailable message.

20 Claims, 4 Drawing Sheets

(56) References Cited

U.S. PATENT DOCUMENTS

| | | | | |
|---|---|---|---|---|
| 8,248,027 B2* | 8/2012 | Sakoda | H02J 5/005 | 307/104 |
| 8,285,231 B2* | 10/2012 | Rofougaran | H01Q 1/2283 | 343/700 MS |
| 8,295,788 B2* | 10/2012 | Rofougaran | H01Q 1/2283 | 455/110 |
| 8,301,092 B2* | 10/2012 | Rofougaran | H01Q 1/2283 | 343/700 MS |
| 8,390,249 B2* | 3/2013 | Walley | H01M 2/0267 | 320/106 |
| 8,421,410 B2* | 4/2013 | Takada | B60L 11/182 | 180/65.27 |
| 8,421,411 B2* | 4/2013 | Takada | B60L 11/182 | 180/65.27 |
| 8,422,944 B2* | 4/2013 | Flygh | G06F 1/1632 | 320/106 |
| 8,422,967 B2* | 4/2013 | Rofougaran | H01Q 1/2283 | 455/121 |
| 8,432,326 B2* | 4/2013 | Rofougaran | H01Q 1/2283 | 343/772 |
| 8,447,250 B2* | 5/2013 | Rofougaran | H01Q 1/2283 | 343/700 MS |
| 8,457,581 B2* | 6/2013 | Rofougaran | H01Q 1/2283 | 343/702 |
| 8,519,667 B2* | 8/2013 | Tsai | H02J 7/025 | 320/108 |
| 8,521,106 B2* | 8/2013 | Rofougaran | H01Q 1/2283 | 343/700 MS |
| 8,548,380 B2* | 10/2013 | Cox | H04W 52/0274 | 235/380 |
| 8,577,314 B2* | 11/2013 | Rofougaran | H01Q 1/2283 | 455/121 |
| 8,618,937 B2* | 12/2013 | Rofougaran | H01Q 1/2283 | 340/572.1 |
| 8,660,500 B2* | 2/2014 | Rofougaran | H01Q 1/2283 | 343/700 R |
| 8,660,505 B2* | 2/2014 | Rofougaran | H01Q 1/2283 | 343/700 MS |
| 8,666,335 B2* | 3/2014 | Rofougaran | H01Q 1/2283 | 343/829 |
| 8,686,685 B2* | 4/2014 | Moshfeghi | H02J 7/025 | 320/107 |
| 8,716,977 B2* | 5/2014 | Walley | H01M 2/0267 | 307/104 |
| 8,725,330 B2* | 5/2014 | Failing | B60L 3/00 | 701/22 |
| 8,743,002 B2* | 6/2014 | Rofougaran | H01Q 1/2283 | 343/772 |
| 8,761,669 B2* | 6/2014 | Rofougaran | H01Q 1/2283 | 343/700 MS |
| 8,766,591 B2* | 7/2014 | Takada | B60L 11/182 | 320/108 |
| 8,766,864 B2* | 7/2014 | Rofougaran | H01Q 1/2283 | 343/772 |
| 8,787,997 B2* | 7/2014 | Rofougaran | H01Q 1/2283 | 257/499 |
| 8,811,923 B2* | 8/2014 | Rofougaran | H01Q 1/2283 | 455/121 |
| 8,831,540 B2* | 9/2014 | Rofougaran | H01Q 1/2283 | 343/762 |
| 8,841,881 B2* | 9/2014 | Failing | B60L 3/00 | 307/65 |
| 8,843,061 B2* | 9/2014 | Rofougaran | H01Q 1/2283 | 455/121 |
| 8,849,194 B2* | 9/2014 | Rofougaran | H01Q 1/2283 | 343/912 |
| 8,849,214 B2* | 9/2014 | Rofougaran | H01Q 1/2283 | 455/41.2 |
| 8,929,841 B2* | 1/2015 | Rofougaran | H01Q 1/2283 | 345/173 |
| 8,952,655 B2* | 2/2015 | Walley | H01M 2/0267 | 307/104 |
| 8,958,768 B2* | 2/2015 | Rofougaran | H01Q 1/2283 | 343/702 |
| 8,983,386 B2* | 3/2015 | Rofougaran | H01Q 1/2283 | 455/39 |
| 8,995,937 B2* | 3/2015 | Rofougaran | H01Q 1/2283 | 340/572.7 |
| 9,013,311 B2* | 4/2015 | Rofougaran | H01Q 1/2283 | 340/10.1 |
| 9,026,047 B2* | 5/2015 | Royston | H04B 5/0037 | 455/41.1 |
| 9,088,075 B2* | 7/2015 | Rofougaran | H01Q 1/2283 | |
| 9,114,719 B1* | 8/2015 | Failing | B60L 3/00 | |
| 9,157,994 B2* | 10/2015 | Rofougaran | H01Q 1/2283 | |
| 9,166,438 B2* | 10/2015 | Sultenfuss | H02J 7/025 | |
| 9,329,261 B2* | 5/2016 | Rofougaran | H01Q 1/2283 | |
| 9,393,878 B1* | 7/2016 | Failing | B60L 3/00 | |
| 9,407,106 B2* | 8/2016 | Redding | H02J 5/005 | |
| 9,417,318 B2* | 8/2016 | Rofougaran | H01Q 1/2283 | |
| 9,431,839 B2* | 8/2016 | Suomela | H04B 5/0031 | |
| 9,431,844 B2* | 8/2016 | Redding | H02J 5/005 | |
| 9,442,190 B2* | 9/2016 | Rofougaran | H01Q 1/2283 | |
| 9,537,984 B2* | 1/2017 | Thill | G06K 19/0723 | |
| 9,590,444 B2* | 3/2017 | Walley | H02J 7/025 | |
| 9,749,016 B2* | 8/2017 | Cox | H04W 52/0274 | |
| 2005/0206530 A1* | 9/2005 | Cumming | G01D 4/006 | 340/870.02 |
| 2007/0188144 A1* | 8/2007 | Hara | G06F 1/3203 | 320/132 |
| 2008/0194289 A1* | 8/2008 | Lin | H04M 1/2535 | 455/556.1 |
| 2009/0079417 A1* | 3/2009 | Mort | G01R 15/14 | 324/111 |
| 2010/0029202 A1* | 2/2010 | Jolivet | G06K 7/0008 | 455/41.1 |
| 2010/0308651 A1* | 12/2010 | Rofougaran | H01Q 1/2283 | 307/11 |
| 2010/0308668 A1* | 12/2010 | Rofougaran | H01Q 1/2283 | 307/149 |
| 2010/0308767 A1* | 12/2010 | Rofougaran | H01Q 1/2283 | 320/108 |
| 2010/0308885 A1* | 12/2010 | Rofougaran | H01Q 1/2283 | 327/297 |
| 2010/0308970 A1* | 12/2010 | Rofougaran | H01Q 1/2283 | 340/10.1 |
| 2010/0308997 A1* | 12/2010 | Rofougaran | H01Q 1/2283 | 340/572.7 |
| 2010/0309040 A1* | 12/2010 | Rofougaran | H01Q 1/2283 | 342/104 |
| 2010/0309052 A1* | 12/2010 | Rofougaran | H01Q 1/2283 | 342/386 |
| 2010/0309056 A1* | 12/2010 | Rofougaran | H01Q 1/2283 | 342/417 |
| 2010/0309069 A1* | 12/2010 | Rofougaran | H01Q 1/2283 | 343/745 |
| 2010/0309071 A1* | 12/2010 | Rofougaran | H01Q 1/2283 | 343/772 |
| 2010/0309072 A1* | 12/2010 | Rofougaran | H01Q 1/2283 | 343/772 |
| 2010/0309073 A1* | 12/2010 | Rofougaran | H01Q 1/2283 | 343/772 |
| 2010/0309074 A1* | 12/2010 | Rofougaran | H01Q 1/2283 | 343/772 |
| 2010/0309075 A1* | 12/2010 | Rofougaran | H01Q 1/2283 | 343/772 |
| 2010/0309076 A1* | 12/2010 | Rofougaran | H01Q 1/2283 | 343/772 |
| 2010/0309077 A1* | 12/2010 | Rofougaran | H01Q 1/2283 | 343/776 |
| 2010/0309079 A1* | 12/2010 | Rofougaran | H01Q 1/2283 | 343/777 |
| 2010/0309824 A1* | 12/2010 | Rofougaran | H01Q 1/2283 | 370/277 |
| 2010/0311324 A1* | 12/2010 | Rofougaran | H01Q 1/2283 | 455/39 |
| 2010/0311332 A1* | 12/2010 | Roufougaran | H01Q 1/2283 | 455/41.2 |

(56) References Cited

U.S. PATENT DOCUMENTS

| | | | |
|---|---|---|---|
| 2010/0311333 A1* | 12/2010 | Rofougaran | H01Q 1/2283 455/41.2 |
| 2010/0311338 A1* | 12/2010 | Rofougaran | H01Q 1/2283 455/41.3 |
| 2010/0311355 A1* | 12/2010 | Rofougaran | H01Q 1/2283 455/91 |
| 2010/0311356 A1* | 12/2010 | Rofougaran | H01Q 1/2283 455/91 |
| 2010/0311359 A1* | 12/2010 | Rofougaran | H01Q 1/2283 455/110 |
| 2010/0311363 A1* | 12/2010 | Rofougaran | H01Q 1/2283 455/121 |
| 2010/0311364 A1* | 12/2010 | Rofougaran | H01Q 1/2283 455/127.1 |
| 2010/0311367 A1* | 12/2010 | Rofougaran | H01Q 1/2283 455/129 |
| 2010/0311369 A1* | 12/2010 | Rofougaran | H01Q 1/2283 455/129 |
| 2010/0311376 A1* | 12/2010 | Rofougaran | H01Q 1/2283 455/269 |
| 2010/0311379 A1* | 12/2010 | Rofougaran | H01Q 1/2283 455/307 |
| 2010/0311380 A1* | 12/2010 | Rofougaran | H01Q 1/2283 455/307 |
| 2010/0311472 A1* | 12/2010 | Rofougaran | H01Q 1/2283 455/572 |
| 2011/0025264 A1* | 2/2011 | Mochida | H01M 10/425 320/108 |
| 2011/0074342 A1* | 3/2011 | MacLaughlin | H02J 7/025 320/108 |
| 2011/0115303 A1* | 5/2011 | Baarman | H02J 17/00 307/104 |
| 2011/0127951 A1* | 6/2011 | Walley | H02J 7/025 320/108 |
| 2011/0127952 A1* | 6/2011 | Walley | G06K 7/10207 320/108 |
| 2011/0127953 A1* | 6/2011 | Walley | G06K 7/10207 320/108 |
| 2011/0127954 A1* | 6/2011 | Walley | H01M 2/0267 320/108 |
| 2011/0156640 A1* | 6/2011 | Moshfeghi | H02J 7/025 320/108 |
| 2011/0298422 A1* | 12/2011 | Failing | B60L 3/00 320/109 |
| 2011/0301795 A1* | 12/2011 | Failing | B60L 3/00 701/22 |
| 2011/0302078 A1* | 12/2011 | Failing | B60L 3/00 705/39 |
| 2012/0062172 A1* | 3/2012 | Takada | B60L 11/182 320/108 |
| 2012/0104998 A1* | 5/2012 | Takada | B60L 11/182 320/108 |
| 2012/0153894 A1* | 6/2012 | Widmer | H04B 5/0037 320/108 |
| 2012/0242286 A1* | 9/2012 | Takada | B60L 11/182 320/108 |
| 2012/0242287 A1* | 9/2012 | Takada | B60L 11/182 320/108 |
| 2012/0286724 A1* | 11/2012 | Tsai | H02J 7/025 320/108 |
| 2012/0306285 A1* | 12/2012 | Kim | H02J 17/00 307/104 |
| 2012/0315843 A1* | 12/2012 | Cox | H04W 52/0274 455/41.1 |
| 2013/0072138 A1* | 3/2013 | Rofougaran | H01Q 1/2283 455/102 |
| 2013/0072141 A1* | 3/2013 | Rofougaran | H01Q 1/2283 455/127.2 |
| 2013/0154560 A1* | 6/2013 | Walley | H01M 2/0267 320/108 |
| 2013/0181665 A1* | 7/2013 | Lee | H02J 7/007 320/108 |
| 2013/0237163 A1* | 9/2013 | Rofougaran | H01Q 1/2283 455/77 |
| 2013/0237166 A1* | 9/2013 | Rofougaran | H01Q 1/2283 455/127.1 |
| 2013/0252566 A1* | 9/2013 | Rofougaran | H01Q 1/2283 455/129 |
| 2013/0257364 A1* | 10/2013 | Redding | H02J 5/005 320/108 |
| 2013/0257365 A1* | 10/2013 | Redding | H02J 5/005 320/108 |
| 2013/0259143 A1* | 10/2013 | Rofougaran | H01Q 1/2283 375/256 |
| 2013/0336423 A1* | 12/2013 | Rofougaran | H01Q 1/2283 375/300 |
| 2014/0035516 A1* | 2/2014 | Fratti | H02J 7/0013 320/108 |
| 2014/0065961 A1* | 3/2014 | Cox | H04W 52/0274 455/41.1 |
| 2014/0080425 A1* | 3/2014 | Rofougaran | H01Q 1/2283 455/68 |
| 2014/0085126 A1* | 3/2014 | Rofougaran | H01Q 1/2283 342/107 |
| 2014/0117921 A1* | 5/2014 | Suomela | H04B 5/0031 320/103 |
| 2014/0155125 A1* | 6/2014 | Thill | G06K 19/0723 455/572 |
| 2014/0225560 A1* | 8/2014 | Walley | H01M 2/0267 320/108 |
| 2014/0292267 A1* | 10/2014 | Ahn | H02J 7/025 320/108 |
| 2014/0306657 A1* | 10/2014 | Lundgren | H02J 7/025 320/108 |
| 2015/0097520 A1* | 4/2015 | Lin | H02J 7/025 320/108 |
| 2015/0141012 A1* | 5/2015 | Ramkumar | H04W 48/20 455/435.3 |
| 2015/0155739 A1* | 6/2015 | Walley | H01M 2/0267 320/108 |
| 2015/0193642 A1* | 7/2015 | Rofougaran | H01Q 1/2283 340/10.1 |
| 2015/0236757 A1* | 8/2015 | Lee | H02J 7/025 320/108 |
| 2015/0263550 A1* | 9/2015 | Han | H02J 7/0042 320/108 |
| 2015/0270740 A1* | 9/2015 | Lee | H02J 7/025 320/108 |
| 2015/0280325 A1* | 10/2015 | Rofougaran | H01Q 1/2283 343/771 |
| 2016/0211890 A1* | 7/2016 | Cox | H04W 52/0274 |
| 2016/0249157 A1* | 8/2016 | Fine | H04W 4/80 |
| 2016/0365747 A1* | 12/2016 | Redding | H02J 5/005 |
| 2016/0380471 A1* | 12/2016 | Moshfeghi | H02J 7/025 320/108 |
| 2016/0380472 A1* | 12/2016 | Moshfeghi | H02J 7/025 320/108 |

OTHER PUBLICATIONS

Alliance for Wireless Power, "A4WP Wireless Power Transfer System Baseline System Specification (BSS)," v1.2, Jan. 29, 2014.

* cited by examiner

POWER PROVIDING EQUIPMENT, MOBILE DEVICE, OPERATING METHOD OF MOBILE DEVICE

RELATED APPLICATIONS

This application claims priority to U.S. Provisional Application Ser. No. 62/015,534, filed Jun. 23, 2014, which is herein incorporated by reference.

BACKGROUND

Technical Field

The present disclosure relates to an electronic device and a method. More particularly, the present disclosure relates to a power providing equipment a mobile device, and an operating method of a mobile device.

Description of Related Art

With advances in electronic technology, wireless power systems have been widely used.

A typical wireless power system includes a power transmitter and a power receiver. When the power receiver (usually be a mobile device) approaches the power transmitter, the power transmitter can charge the power receiver. Through such an operation, it is convenience for users to charge their mobile devices without cables.

SUMMARY

One aspect of the present disclosure is related to a mobile device. In accordance with one embodiment of the present disclosure, the mobile device includes a battery, a wireless power receiver, a communication transmitter, a target module, and a controller. The wireless power receiver is configured for receiving a wireless power signal from a power providing equipment. The controller electrically connected with the battery, the wireless power receiver, the target module, and the communication transmitter. The controller is configured for receiving, through the communication receiver, a request from the power providing equipment; transmitting a request command corresponding to the request to the target module; and controlling the communication transmitter to transmit an unavailable message to the power providing equipment under a condition that no response corresponding to the request command is received or an insufficient energy message is received from the target module, so that the power providing equipment charges the battery of the mobile device by utilizing the wireless power signal according to the unavailable message.

Another aspect of the present disclosure relates to a mobile device. In accordance with one embodiment of the present disclosure, the mobile device includes a battery, a wireless power receiver, a communication transmitter, and a controller. The wireless power receiver is configured for receiving a wireless power signal from a power providing equipment. The controller electrically connected with the battery, the wireless power receiver, and the communication transmitter. The controller is configured for receiving, through the communication receiver, a request from the power providing equipment; and controlling the communication transmitter to transmit an unavailable message to the power providing equipment under a condition that a battery level of the battery is less than a threshold value, so that the power providing equipment charges the battery of the mobile device by utilizing the wireless power signal according to the unavailable message.

Another aspect of the present disclosure relates to a power providing equipment. In accordance with one embodiment of the present disclosure, the power providing equipment includes a wireless power transmitter, a communication transmitter, a communication receiver, and a controller. The wireless power transmitter is configured for transmitting a wireless power signal to a mobile device. The controller is electrically connected with the wireless power transmitter, a communication transmitter, and the communication receiver. The controller is configured for controlling the communication transmitter to transmit a request to the mobile device; receiving, through the communication receiver, an unavailable message from the mobile device, in which the unavailable message indicates that a battery level of a battery of the mobile device is less than a threshold value; and controlling the wireless power transmitter to transmit the wireless power signal to the mobile device according to the unavailable message, so that a battery of the mobile device is charged by utilizing the wireless power signal.

Another aspect of the present disclosure relates to an operating method of a mobile device. In accordance with one embodiment of the present disclosure, the operating method includes receiving a wireless power signal from a power providing equipment; receiving a request from the power providing equipment; and under a condition that a battery level of a battery of the mobile device is less than a threshold value, transmitting an unavailable message to the power providing equipment, so that the power providing equipment charges the battery of the mobile device by utilizing the wireless power signal according to the unavailable message.

Through an application of one embodiment described above, the power providing equipment can charge the mobile device when the power of the mobile device is insufficient to acquire the requested information.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
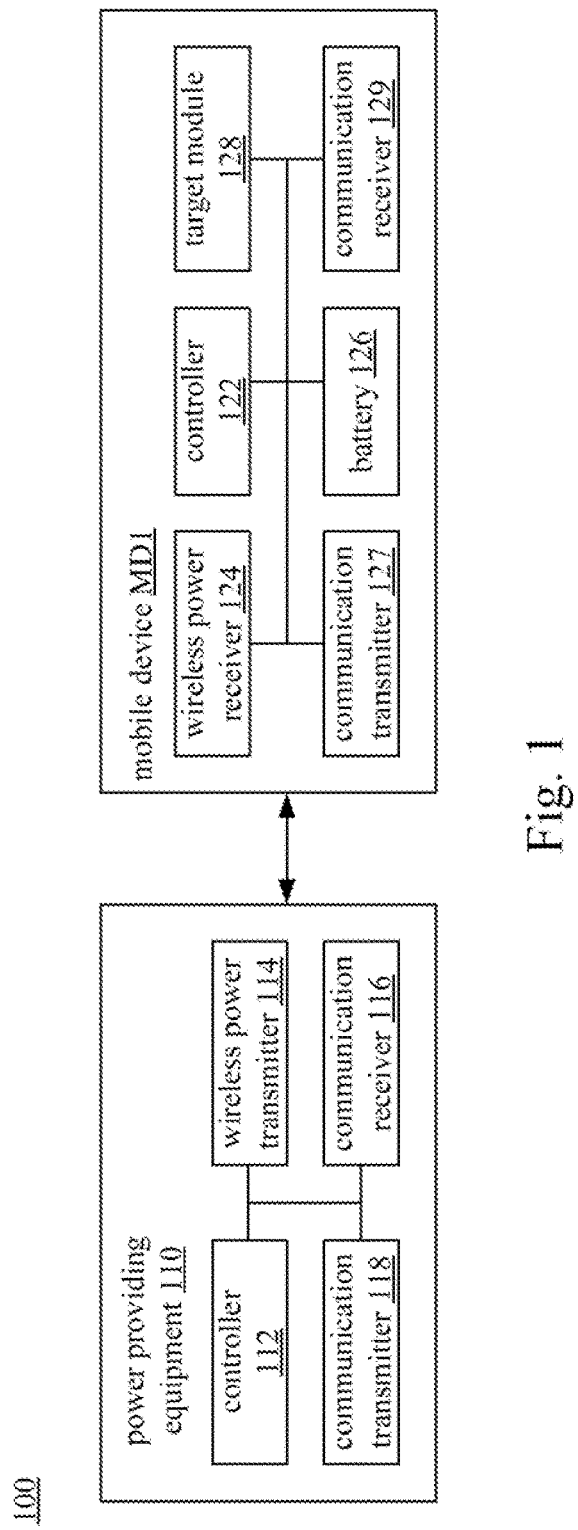
FIG. 1 illustrates a wireless power system in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, the terms "comprise" or "comprising," "Include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

One aspect of the present disclosure is related to a mobile device. In the paragraphs below, a smart phone or a tablet computer will be taken as an example to describe details of the mobile device. However, the present disclosure is not limited in this regard.

FIG. 1 illustrates a wireless power system 100 in accordance with one embodiment of the present disclosure. In this embodiment, the wireless power system 100 includes a power providing equipment 110 and a mobile device MD1. In this embodiment, the power providing equipment 110 includes a controller 112, a wireless power transmitter 114, a communication receiver 116, and a communication transmitter 118. The controller 112, the wireless power transmitter 114, the communication receiver 116, and communication transmitter 118 are electrically connected. In this embodiment, the mobile device MD1 includes a controller 122, a wireless power receiver 124, a battery 126, a communication transmitter 127, a target module 128 and a communication receiver 129. The controller 122 the wireless power receiver 124, the battery 126, the communication transmitter 127, the target module 128, and the communication receiver 129 are electrically connected. In one embodiment, each of the mobile device MD1 and the power providing equipment 110 may includes some modules such as bluetooth low energy (BLE) module and liquid crystal display (LCD) module, but the present disclosure is not limited in this regard.

In one embodiment, each of the controllers 112, 122 can be realized by, for example, a control circuit, such as a central processor, a microprocessor, a programmable logic device (PLD), a field-programmable gate array (FPGA), or an integrated control circuit, but is not limited in this regard. In one embodiment, the wireless power transmitter 114 may be realized by, for example, a coil and an analog circuit (e.g. a matching circuit), but is not limited in this regard. The wireless power receiver 124 may be realized by, for example, a coil and an analog circuit (e.g., a rectifier), but is not limited in this regard. In one embodiment, each of the communication receivers 116, 129, and the communication transmitters 118, 127 may be realized by a suitable communication module, such as a wifi module, a bluetooth module, a near field communication module, a cellular link module, and/or an in-band communication module for wireless power transfer, but is not limited in this regard. In one embodiment, the target module 128 may be realized by any suitable module in the mobile device MD1, such as the BLE module, the NFC module, and the display module, but is not limited in this regard.

In one embodiment, the operations of the power providing equipment 110 and the mobile device MD1 may respectively conform to the operations of a power transmitter (PTX) and a power receiver (PRX) defined by Wireless Power Consortium (WPC), a transmitter and receiver defined by Power Matter Alliance, or a power transfer unit (PTU) and a power receiving unit (PRU) defined by Alliance for Wireless Power (A4WP).

In one embodiment, the controller 112 of the power providing equipment 110 is configured to control the communication transmitter 118 to transmit a request for requested information to the mobile device MD1. The controller 122 of the mobile device MD1 is configured to determine whether the requested information is unavailable due to an insufficient power in the battery 126 (e.g., the battery level of the battery 126 is lower than 3%). Under a condition that the requested information is unavailable, the controller 122 controls the communication transmitter 127 to transmit an unavailable message to the power providing equipment 110. According to the unavailable message, the power providing equipment 110 transmits the wireless power signal to the mobile device MD1 and charges the battery 126 of the mobile device MD1 to a predetermined battery level (e.g., 5%) or for a predetermined time (e.g., 5 minutes) by utilizing the wireless power signal. After the battery 126 of the mobile device MD1 is charged to a predetermined battery level (e.g., 5%) or for a predetermined time (e.g., 5 minutes) by utilizing the wireless power signal corresponding to the unavailable message, the power providing equipment 110 stops charging the battery 126 of the mobile device MD1.

By doing so, the controller 122 can have at least some energy to control the communication transmitter 127 to transmit the requested information to the power providing equipment 110.

To facilitate the description to follow, an operating method of a mobile device will be described below with reference to FIG. 2. However, the present disclosure is not limited to the embodiment below.

It should be noted that the operating method can be applied to a mobile device having a structure that is the same as or similar to the structure of the mobile device MD1 shown in FIG. 1. To simplify the description below, in the following paragraphs, the embodiment shown in FIG. 1 will be used as an example to describe the operating method according to an embodiment of the present disclosure. However, the present disclosure is not limited to application to the embodiment shown in FIG. 1.

In addition, it should be noted that in the steps of the following operating method, no particular sequence is required unless otherwise specified. Moreover, the following steps also may be performed simultaneously or the execution times thereof may at least partially overlap.

Furthermore, the steps of the following operating method may be added to, replaced, and/or eliminated as appropriate, in accordance with various embodiments of the present disclosure.

Figure 2:
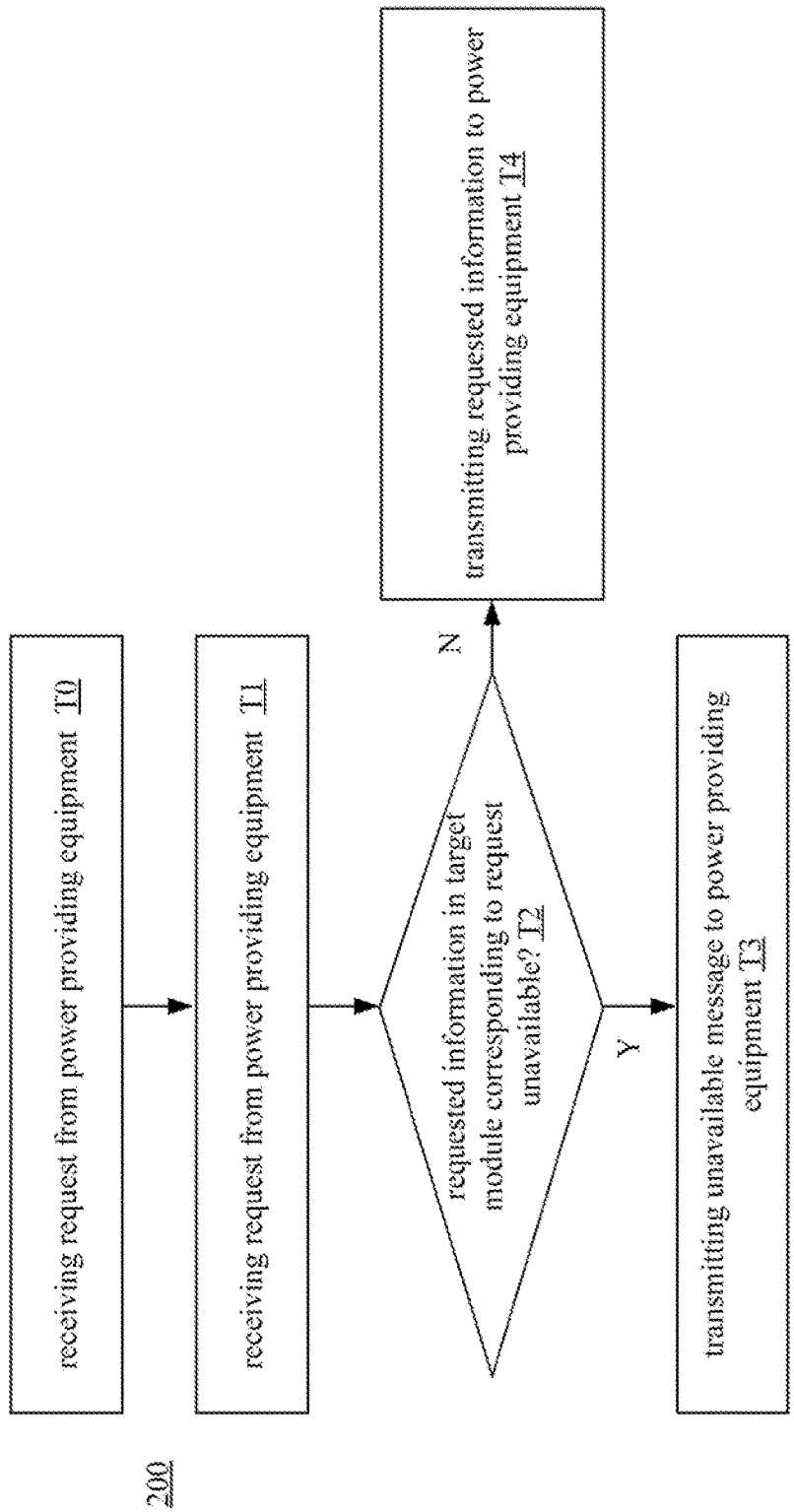
FIG. 2 is a flowchart of an operating method of a mobile device in accordance with one embodiment of the present disclosure.

Reference is made to FIG. 2. The operating method 200 includes the steps below.

In step T0, the wireless power receiver 124 of the mobile device MD1 receives a wireless power signal from the power providing equipment 110. In one embodiment, this step may be omitted. That is, the wireless power receiver 124 does not receive the wireless power signal before a request for the requested information is transmitted from the power providing equipment 110 (in step T1).

In step T1, the controller 122 of the mobile device MD1 receives the request for the requested information from the power providing equipment 110.

In one embodiment, the requested information may be an input of a user received by a user interface (e.g., a touch display). In one embodiment, the requested information may be a series of numbers. In one embodiment, the requested information may be a figure or a bio-signature of the user (e.g., a finger print). In one embodiment, the requested information may be a registration data. In one embodiment, the requested information may be personal data of the user, such as a name or a birthday of the user. In one embodiment, the requested information may be a signature for requesting the wireless power provided by the power providing equipment 110. In one embodiment, the requested information may be a real signature or a check sign. In one embodiment, the requested information may be an identity of the mobile device MD1 or a module of the mobile device MD1. In one embodiment, the requested information may be a phone number (e.g., IMSI) of the mobile device MD1. In one embodiment, the requested information may include a BLE ID used in A4WP specification and/or a PRX ID defined in WPC specification.

In step T2, the controller 122 of the mobile device MD1 determines whether the requested information is unavailable due to an insufficient energy of the battery 126 (e.g., the battery level of the battery 126 is lower than 3%). If so, step T3 is executed. If not, step T4 is executed.

In one embodiment, the controller 122 of the mobile device MD1 may detect the battery level of the battery 126 and determine that the requested information corresponding to the request is unavailable under a condition that the battery level of the battery 126 is less than a threshold value (e.g., 5%).

In one embodiment, the controller 122 of the mobile device MD1 may transmit a request command to the target module 128 to request the requested information. The controller 122 of the mobile device MD1 may determine the requested information corresponding to the request is unavailable under a condition that no response corresponding to the request command is received from the target module 128 or an insufficient energy message corresponding to the request command is received from the target module 128.

In step T3, under a condition that the requested information is unavailable, the controller 122 of the mobile device MD1 controls the communication transmitter 127 to transmit an unavailable message to the power providing equipment 110. According to the unavailable message, the power providing equipment 110 transmits the wireless power signal to the mobile device MD1 and charges the battery 126 of the mobile device MD1 to a predetermined battery level (e.g., or for a predetermined time (e.g., 5 minutes) by utilizing the wireless power signal.

In step T4, under a condition that the requested information is available, the controller 122 of the mobile device MD1 controls the communication transmitter 127 to transmit the requested information to the power providing equipment 110. The power providing equipment 110 may verify the requested information. If the requested information is correct (passes the verification), according to the verification result, the power providing equipment 110 transmits the wireless power signal to the mobile device MD1 and charges the battery 126 of the mobile device MD1 by utilizing the wireless power signal until the battery 126 of the mobile device MD1 is full or the mobile device MD1 is out of the service range of the power providing equipment 110. If the requested information is incorrect (fails the verification), according to the verification result, the power providing equipment 110 does not charge or stops charging the battery 126 of the mobile device MD1.

In one embodiment, the unavailable message may be a specific code. In one embodiment, the unavailable message indicates the requested information is unavailable due to the power in the battery 126 of the mobile device MD1 is insufficient for the controller 122 to acquire the requested information from the target module 128. In one embodiment, the unavailable message may be battery level information (e.g., a percentage) of the battery 126 of the mobile device MD1. In one embodiment, the unavailable message indicates that a battery level of the battery 126 of the mobile device MD1 is less than a threshold value (e.g., 5%).

In one embodiment, under a condition that the power providing equipment 110 has charged the battery 126 of the mobile device for a predetermined time (e.g., 5 minutes) by utilizing the wireless power signal transmitted after receiving the unavailable message, the power providing equipment 110 stops charging the battery 126 of the mobile device MD1.

In one embodiment, under a condition that the power providing equipment 110 has charged the battery 126 of the mobile device MD1 to a predetermined battery level (e.g., 5%) by utilizing the wireless power signal transmitted according to the unavailable message, the power providing equipment 110 stops charging the battery 126 of the mobile device MD1.

In one embodiment, under one of the cases that the power providing equipment 110 has charged the battery 126 of the mobile device MD1 to a predetermined battery level (e.g., 5%) and for a predetermined time (e.g., 5 minutes) by utilizing the wireless power signal transmitted after receiving the unavailable message, the power providing equipment 110 stops charges the battery 126 of the mobile device MD1.

In one embodiment, the controller 122 of the mobile device MD1 controls the communication transmitter 127 to transmit battery level information of the battery 126 to the power providing equipment 110, so as to allow the power providing equipment 110 to stop charging the battery 126 of the mobile device MD1 under a condition that the battery 126 of the mobile device MD1 is charged to the predetermined battery level (e.g., 5%) according to the battery level information of the battery 126 transmitted by the communication transmitter 127 of the mobile device MD1.

In one embodiment, the battery level information of the battery 126 may be periodically transmitted (e.g., every 5 minutes). In one embodiment, the battery level information of the battery 126 may be transmitted at each time the battery level of the battery 126 is increased for a predetermined value (e.g., 1%).

In one embodiment, under a condition that the battery of the mobile device is charged to a predetermined battery level by utilizing the wireless power signal transmitted by the power providing equipment, the controller 122 of the mobile device MD1 controls the communication transmitter 127 to transmit a stop command to the power providing equipment 110, so that the power providing equipment 110 stops charging the battery 126 of the mobile device MD1 by utilizing the wireless power signal according to the stop command.

In one embodiment, to stop charging the battery 126 of the mobile device MD1, the power providing equipment 110 may stop transmitting the wireless power signal to the mobile device MD1 or transmit a terminate command to the mobile device MD1 so that the controller 122 of the mobile device MD1 stops controlling a charging module (not shown) to charge the battery 126 of the mobile device MD1 by utilizing the wireless power signal according to the terminate command.

In one embodiment, when the battery 126 of the mobile device MD1 is charged to a certain battery level (e.g., 3%), so that the controller 122 of the mobile device MD1 is able to acquire the requested information from the target module 128, the controller 122 of the mobile device MD1 may control the communication transmitter 127 to transmit the requested information to the power providing equipment 110. At this time, the power providing equipment 110 may verify the requested information. If the requested information is correct (passes the verification), according to the verification result, the power providing equipment 110 transmits the wireless power signal to the mobile device MD1 and charges the battery 126 of the mobile device MD1 by utilizing the wireless power signal until the battery 126 of the mobile device MD1 is full or the mobile device MD1 is out of the service range of the power providing equipment 110. If the requested information is incorrect (fails the verification), according to the verification result, the power providing equipment 110 does not charge or stops charging the battery 126 of the mobile device MD1.

In one embodiment, each of the request, the requested information, the unavailable message, the stop command, the terminate command, and the battery level information of the battery 126 transmitted between the power providing equipment 110 and the mobile device MD1 may be transmitted by an in-band communication attached to the wireless power signal. In one embodiment, these messages and commands may be transmitted by utilizing a load modulation technique or a frequency shift keying (FSK) modulation technique, but the present disclosure is not limited in this regard.

In another embodiment, these messages and commands may be transmitted by an out-band communication that is realized by another type of communication. In one embodiment, these messages and commands may be transmitted by utilizing a BLE technique or a NFC technique, but the present disclosure is not limited in this regard.

Through the operations described above, the controller 122 can have at least some energy to control the communication transmitter 127 to transmit the requested information to the power providing equipment 110.

To facilitate the description to follow, an operating method of a power providing equipment will be described below with reference to FIG. 3. However, the present disclosure is not limited to the embodiment below.

It should be noted that the operating method can be applied to a power providing equipment having a structure that is the same as or similar to the structure of the power providing equipment 110 shown in FIG. 1. To simplify the description below, in the following paragraphs, the embodiment shown in FIG. 1 will be used as an example to describe the operating method according to an embodiment of the present disclosure. However, the present disclosure is not limited to application to the embodiment shown in FIG. 1.

In addition, it should be noted that in the steps of the following operating method, no particular sequence is required unless otherwise specified. Moreover, the following steps also may be performed simultaneously or the execution times thereof may at least partially overlap.

Furthermore, the steps of the following operating method may be added to, replaced, and/or eliminated as appropriate, in accordance with various embodiments of the present disclosure.

Figure 3:
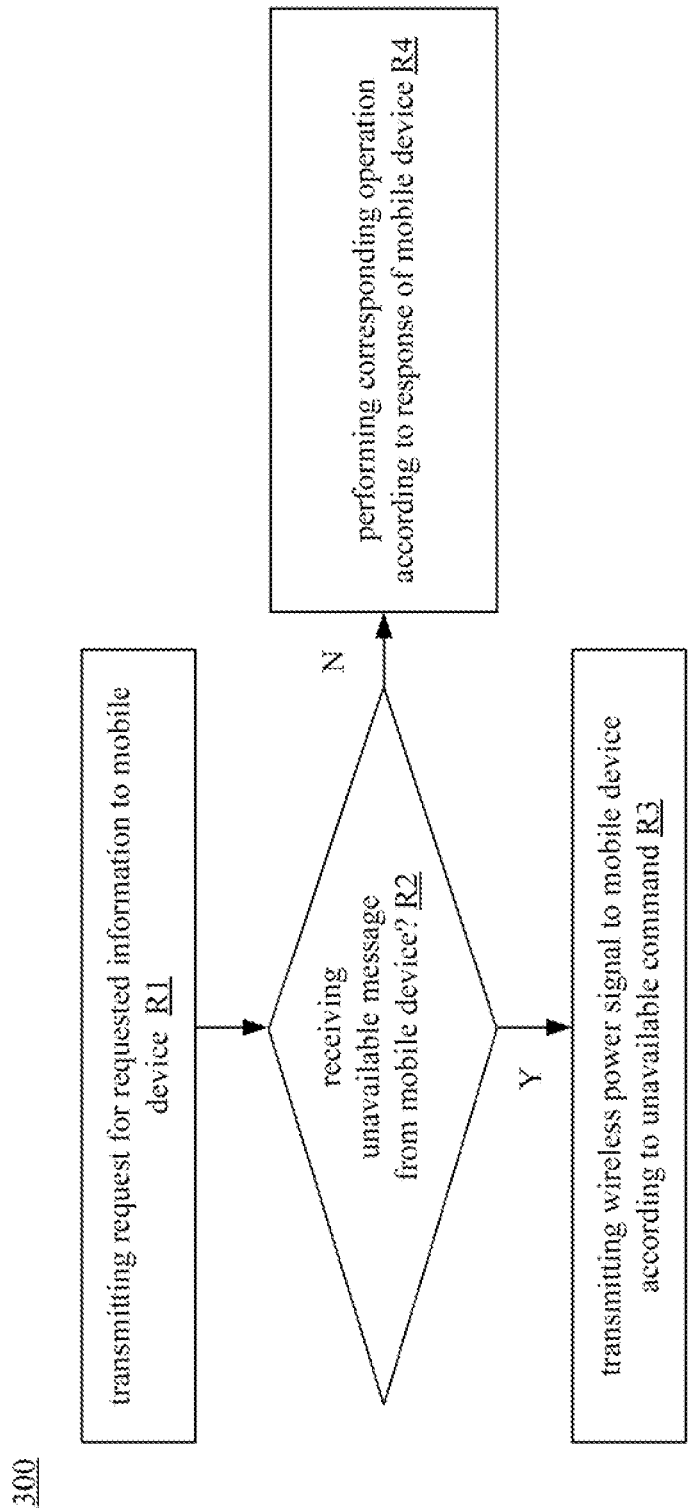
FIG. 3 is a flowchart of an operating method of a power providing equipment in accordance with one embodiment of the present disclosure.

Reference is made to FIG. 3. The operating method 300 includes the steps below.

In step R1, the controller 112 of the power providing equipment 110 controls the communication transmitter 118 to transmit a request for requested information to the mobile device MD1.

It should be noted that, details of the requested information can be ascertained with reference to the paragraphs above, and a description in this regard will not be repeated herein.

In step R2, the controller 112 of the power providing equipment 110 determines whether an unavailable message from the mobile device MD1 is received. In one embodiment, the unavailable message indicates that the requested information is unavailable. If so, step R3 is executed. If not, step R4 is executed.

It should be noted that, details of the unavailable message can be ascertained with reference to the paragraphs above, and a description in this regard will not be repeated herein.

In step R3, under a condition that the unavailable message from the mobile device MD1 is received through the communication receiver 116, the controller 112 of the power providing equipment 110 controls the wireless power transmitter 114 to transmit the wireless power signal to the mobile device MD1 according to the unavailable message, so that a battery 126 of the mobile device MD1 is charged by utilizing the wireless power signal.

In step R4, under a condition that the unavailable message from the mobile device MD1 is not received, the controller 112 of the power providing equipment 110 performs corresponding operation according to a response of the mobile device MD1. For example, the controller 112 may receive the requested information through the communication receiver 116, and performing a corresponding operation according to the requested information (e.g., a verification, and charging or not charging the battery 126 according to the verification result). Details about these operations can be ascertained by reference to the paragraphs described above, and a description in this regard will not be repeated herein.

In one embodiment, the controller 112 of the power providing equipment 110 may monitor a battery level of the battery 126 of the mobile device MD1 and a charging time for the power providing equipment 110 charging the battery of the mobile device according to the unavailable message. The controller 112 of the power providing equipment 110 may control the wireless power transmitter 114 or the communication transmitter 118 to stop charging the mobile device MD1 according to the battery level and the charging time.

In one embodiment, under a condition that the power providing equipment 110 has charged the battery 126 of the mobile device for a predetermined time (e.g., 5 minutes) by utilizing the wireless power signal transmitted after receiving the unavailable message, the controller 112 of the power providing equipment 110 controls the wireless power transmitter 114 or the communication transmitter 118 to stop charging the battery 126 of the mobile device MD1.

In one embodiment, under a condition that the power providing equipment 110 has charged the battery 126 of the mobile device to a predetermined battery level (e.g., 5%) by utilizing the wireless power signal transmitted according to the unavailable message, the controller 112 of the power providing equipment 110 controls the wireless power transmitter 114 or the communication transmitter 118 to stop charging the battery 126 of the mobile device MD1.

In one embodiment, under one of the cases that the power providing equipment 110 has charged the battery 126 of the mobile device to a predetermined battery level (e.g., 5%) or for a predetermined time (e.g., 5 minutes) by utilizing the wireless power signal transmitted after receiving the unavailable message, the controller 112 of the power providing equipment 110 controls the wireless power transmitter 114 or the communication transmitter 118 to stop charging the battery 126 of the mobile device MD1.

In one embodiment, the controller 112 of the power providing equipment 110 may receive battery level information of the battery 126 from the mobile device MD1 through the communication receiver 116, so that the controller 112 of the power providing equipment 110 is able to controls the wireless power transmitter 114 or the communication transmitter 118 to stop charging the battery 126 of the mobile device MD1 under a condition that the battery 126 of the mobile device MD1 is charged to a predetermined battery level according to the battery level information of the battery 126 transmitted by the mobile device MD1. It should be noted that details about the battery level information of the battery 126 received from the mobile device can be ascertained by reference to the paragraphs above, and a description in this regard will not be repeated herein.

In one embodiment, the controller 112 of the power providing equipment 110 may receive a stop command from the mobile device MD1 through the communication receiver 116, in which the stop command indicates the battery 126 of the mobile device MD1 is charged to a predetermined battery level (e.g., 5%) or for a predetermined time (e.g., 5 minutes) by utilizing the wireless power signal transmitted by the power providing equipment 110. The controller 112 of the power providing equipment 110 may control the wireless power transmitter 114 or the communication transmitter 118 to stop charging the battery 126 of the mobile device MD1 according to the stop command.

In one embodiment, to stop charging the battery 126 of the mobile device MD1, the controller 112 of the power providing equipment 110 may control the wireless power transmitter 114 to stop transmitting the wireless power signal to the mobile device MD1, or control the communication transmitter 118 to transmit a terminate command to the mobile device MD1 so that the mobile device stops charging the battery 126 of the mobile device MD1 by utilizing the wireless power signal according to the terminate command.

In one embodiment, when the power providing equipment 110 has charged the battery 126 of the mobile device to a predetermined battery level (e.g., 5%) or for a predetermined time (e.g., 5 minutes) by utilizing the wireless power signal transmitted after receiving the unavailable message, the controller 112 of the power providing equipment 110 may control the communication transmitter 118 to transmit a first message to a management device (not shown), The first message indicates that the requested information is not received.

In one embodiment, when the battery 126 of the mobile device MD1 is charged to a certain battery level (e.g., 3%), so that the mobile device MD1 is able to transmit the requested information to the power providing equipment 110, the controller 112 of the power providing equipment 110 may control the communication transmitter 118 to transmit a second message to a management device (not shown). The second message indicates that the requested information is received after charging the mobile device MD1.

In one embodiment, each of the first message and the second message may include the identity of the mobile device MD1, the identity of modules in the mobile device MD1 (e.g., PRX ID, BLE ID), and the location of the mobile device MD1.

Through the operations described above, the controller 122 can have at least some energy to control the communication transmitter 127 to transmit the requested information to the power providing equipment 110.

Figure 4B:
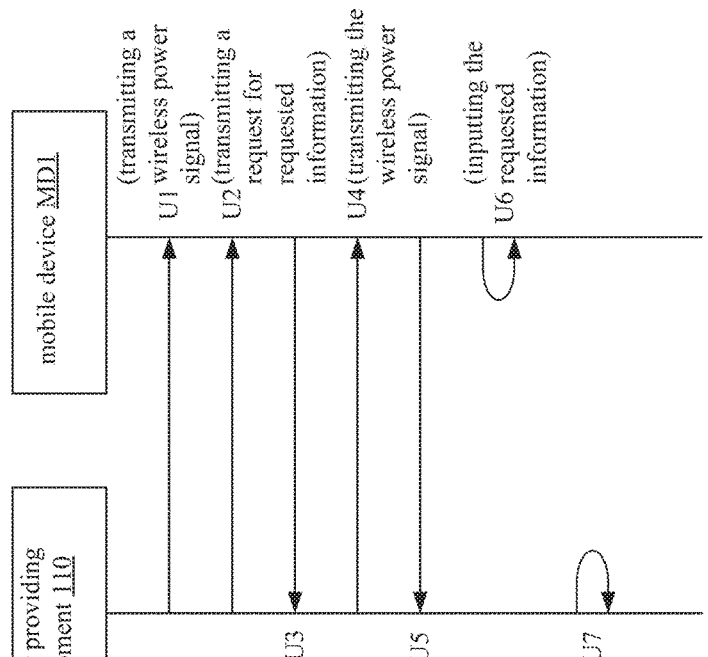
FIG. 4B illustrates operations in a wireless power system in accordance with one embodiment of the present disclosure.
Figure 4A:
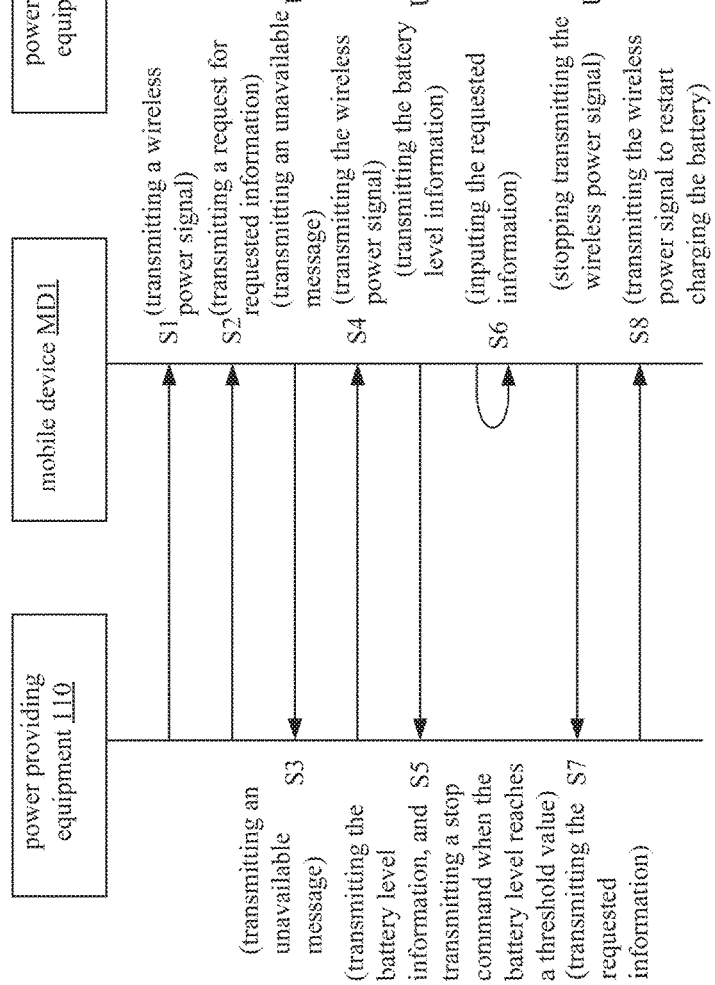
FIG. 4A illustrates operations in a wireless power system in accordance with one embodiment of the present disclosure.

To facilitate the description to follow, an operative example will be described in the paragraphs below with reference to FIG. 4A. However, the present disclosure is not limited to the embodiment below.

In this operative example, the operations in the wireless power system 10 are outlined below.

In operation S1, when the mobile device MD1 comes close to the power providing equipment 110, the controller 112 of the power providing equipment 110 controls the wireless power transmitter 114 to transmit a wireless power signal to the mobile device MD1 to allow/initiate a bi-directional communication.

In operation S2, the controller 112 of the power providing equipment 110 controls the communication transmitter 118 to transmit a request for requested information to the mobile device MD1.

In operation S3, due to the power in the battery 126 is insufficient, the controller 122 of the mobile device MD1 fails to open the display of the mobile device MD1 to show a message to request the requested information from the user. Thus, the controller 122 of the mobile device MD1 controls the communication transmitter 127 to transmit an unavailable message (e.g., 0xFFFF) to the power providing equipment 110 to indicate that the requested information is unavailable due to the power in the battery 126 is insufficient.

In operation S4, the controller 112 of the power providing equipment 110 controls the wireless power transmitter 114 to keep transmitting the wireless power signal to the mobile device MD1 according to the unavailable message.

In operation S5, the controller 122 of the mobile device MD1 controls the communication transmitter 127 to transmit the battery level information of the battery 126 to the power providing equipment 110, so that the power providing equipment 110 is able to know whether the battery 126 of the mobile device is charged to a predetermined battery level (e.g., 5%).

In operation S6, when the battery 126 of the mobile device MD1 is charged to a certain battery level, so that the controller 122 of the mobile device MD1 is able to turn on the display, the controller 122 control the display to show a message and let out a sound to notice the user to input the requested information.

In operation S7, when the controller 122 of the mobile device MD1 gets the requested information, the controller 122 of the mobile device MD1 controls the communication transmitter 127 to transmit the requested information to the power providing equipment 110.

In operation S8, the controller 112 of the power providing equipment 110 may verify the requested information transmitted by the mobile device MD1. When the requested information is correct (passes a verification), according to the requested information, the controller 112 of the power providing equipment 110 may controls the wireless power transmitter 114 to keep transmitting the wireless power signal to the mobile device MD1 and charge the battery 126 of the mobile device MD1 by utilizing the wireless power signal until the battery 126 of the mobile device MD1 is full or the mobile device MD1 is out of the service range of the power providing equipment 110.

To facilitate the description to follow, an operative example will be described in the paragraphs below with reference to FIG. 4B. However, the present disclosure is not limited to the embodiment below.

In this operative example, the operations in the wireless power system 10 are outlined below.

Operations U1-U6 are identical to operation S1-S6, and a description in this regard will not be repeated.

In operations U7, when the mobile device MD1 does not receive the requested information from the mobile device MD1 and the battery level of the battery 126 is greater than (or equal to) a predetermined battery level (e.g., 5%), the controller 112 of the power providing equipment 110 controls the wireless power transmitter 114 to stop transmitting the wireless power signal to the mobile device MD1, or controls the communication transmitter 118 to transmit a terminate command to the mobile device MD1 so that the mobile device MD1 stops charging the battery 126 of the mobile device MD1 by utilizing the wireless power signal according to the terminate command.

Through the operations described above, the mobile device MD1 can have at least some energy to provide the requested information to the power providing equipment 110.

Although the present invention has been described in considerable detail with reference to certain embodiments thereof, other embodiments are possible. Therefore, the scope of the appended claims should not be limited to the description of the embodiments contained herein.

What is claimed is:

1. A mobile device comprises:
   a battery;
   a wireless power receiver configured for receiving a wireless power signal from a power providing equipment;
   a communication receiver;
   a communication transmitter;
   a target module; and
   a controller electrically connected with the battery, the wireless power receiver, the communication receiver, the target module, and the communication transmitter, wherein the controller is configured for:
      receiving, through the communication receiver, a request from the power providing equipment;
      transmitting a request command corresponding to the request to the target module;
      controlling the communication transmitter to transmit an unavailable message to the power providing equipment under a condition that no response corresponding to the request command is received or an insufficient energy message is received from the target module, so that the power providing equipment charges the battery of the mobile device by utilizing the wireless power signal according to the unavailable message;
      transmitting a command to the power providing equipment to stop charging the battery when the battery is charged to a threshold value; and
      transmitting requested information to the power providing equipment for a verification when the battery stops being charged, wherein when the requested information passes the verification, the mobile device receives the wireless power signal for charging the battery and the battery restarts being charged.

2. The mobile device as claimed in claim 1, wherein the controller is further configured for:
   controlling the communication transmitter to transmit a stop command to the power providing equipment under a condition that the battery of the mobile device is charged to a predetermined battery level, so that the power providing equipment stops charging the battery of the mobile device according to the stop command.

3. The mobile device as claimed in claim 1, wherein the power providing equipment stops charging the battery of the mobile device under a condition that the power providing equipment has charged the battery of the mobile device for a predetermined time after receiving the unavailable message.

4. The mobile device as claimed in claim 1, wherein the controller is further configured for:
   controlling the communication transmitter to transmit battery level information of the battery to the power providing equipment, so that the power providing equipment stops charging the battery of the mobile device under a condition that the battery of the mobile device is charged to a predetermined battery level according to the battery level information.

5. The mobile device as claimed in claim 4, wherein the battery level information is periodically transmitted from the communication transmitter to the power providing equipment.

6. A mobile device comprises:
   a battery;
   a wireless power receiver configured for receiving a wireless power signal from a power providing equipment;
   a communication receiver;
   a communication transmitter; and
   a controller electrically connected with the battery, the wireless power receiver, the communication receiver, and the communication transmitter, wherein the controller is configured for:
      receiving, through the communication receiver, a request from the power providing equipment;
      controlling the communication transmitter to transmit an unavailable message to the power providing equipment under a condition that a battery level of the battery is less than a threshold value, so that the power providing equipment charges the battery of the mobile device by utilizing the wireless power signal according to the unavailable message;
      transmitting a command to the power providing equipment to stop charging the battery when the battery is charged to the threshold value; and
      transmitting requested information to the power providing equipment for a verification when the battery stops being charged, wherein when the requested information passes the verification, the mobile device receives the wireless power signal for charging the battery and the battery restarts being charged.

7. The mobile device as claimed in claim 6, wherein the controller is further configured for:
   controlling the communication transmitter to transmit battery level information of the battery to the power providing equipment, so that the power providing equipment stops charging the battery of the mobile device under a condition that the battery of the mobile device is charged to a predetermined battery level.

8. The mobile device as claimed in claim 7, wherein the battery level information is periodically transmitted from the communication transmitter to the power providing equipment.

9. The mobile device as claimed in claim 7, wherein the controller is further configured for:
controlling the communication transmitter to transmit a stop command to the power providing equipment under a condition that the battery of the mobile device is charged to a predetermined battery level, so that the power providing equipment stops charging the battery of the mobile device according to the stop command.

10. The mobile device as claimed in claim 7, wherein the power providing equipment stops charging the battery of the mobile device under a condition that the power providing equipment has charged the battery of the mobile device for a predetermined time after receiving the unavailable message.

11. A power providing equipment comprises:
a wireless power transmitter configured for transmitting a wireless power signal to a mobile device;
a communication transmitter;
a communication receiver; and
a controller electrically connected with the wireless power transmitter, the communication transmitter, and the communication receiver, wherein the controller is configured for:
controlling the communication transmitter to transmit a request to the mobile device;
receiving, through the communication receiver, an unavailable message from the mobile device, wherein the unavailable message indicates that a battery level of a battery of the mobile device is less than a threshold value;
controlling the wireless power transmitter to transmit the wireless power signal to the mobile device according to the unavailable message, so that a battery of the mobile device is charged by utilizing the wireless power signal; controlling the wireless power transmitter to stop transmitting the wireless power signal to the mobile device when the battery is charged to the threshold value; and
receiving requested information from the mobile device, wherein when the requested information passes a verification when the battery stops being charged, the controller controls the wireless power transmitter to transmit the wireless power signal to the mobile device to charge the battery and the battery restarts being charged.

12. The power providing equipment as claimed in claim 11, wherein the power providing equipment stops charging the battery of the mobile device under a condition that the battery of the mobile device is charged to a predetermined battery level.

13. The power providing equipment as claimed in claim 11, wherein the controller is further configured for:
receiving, through the communication receiver, battery level information of the battery transmitted by the mobile device; and
controlling the wireless power transmitter to stop charging the battery of the mobile device under a condition that the battery of the mobile device is charged to a predetermined battery level.

14. The power providing equipment as claimed in claim 11, wherein the controller is further configured for:
receiving, through the communication receiver, a stop command transmitted by the mobile device, wherein the stop command indicates the battery of the mobile device is charged to a predetermined battery level or for a predetermined time; and
controlling the wireless power transmitter to stop charging the battery of the mobile device according to the stop command.

15. The power providing equipment as claimed in claim 11, wherein the power providing equipment stops charging the battery of the mobile device under a condition that the power providing equipment has charged the battery of the mobile device for a predetermined time after receiving the unavailable message.

16. An operating method of a mobile device comprising:
receiving a wireless power signal from a power providing equipment;
receiving a request from the power providing equipment;
under a condition that a battery level of a battery of the mobile device is less than a threshold value, transmitting an unavailable message to the power providing equipment, so that the power providing equipment charges the battery of the mobile device by utilizing the wireless power signal according to the unavailable message;
transmitting a command to the power providing equipment to stop charging the battery when the battery is charged to the threshold value; and
transmitting requested information to the power providing equipment for a verification when the battery stops being charged, wherein when the requested information passes the verification, the mobile device receives the wireless power signal for charging the battery and the battery restarts being charged.

17. The operating method as claimed in claim 16, wherein the power providing equipment stops charging the battery of the mobile device under a condition that the battery of the mobile device is charged to a predetermined battery level.

18. The operating method as claimed in claim 16 further comprising:
transmitting battery level information of the battery to the power providing equipment, so that the power providing equipment stops charging the battery of the mobile device under a condition that the battery of the mobile device is charged to a predetermined battery level.

19. The operating method as claimed in claim 16 further comprising:
transmitting a stop command to the power providing equipment under a condition that the battery of the mobile device is charged to a predetermined battery level, so that the power providing equipment stops charging the battery of the mobile device according to the stop command.

20. The operating method as claimed in claim 16, wherein the power providing equipment stops charging the battery of the mobile device under a condition that the power providing equipment has charged the battery of the mobile device for a predetermined time after receiving the unavailable message.

* * * * *